US008301281B2

(12) United States Patent
Sato et al.

(10) Patent No.: US 8,301,281 B2
(45) Date of Patent: Oct. 30, 2012

(54) HIGH-FREQUENCY SIGNAL INTERPOLATION APPARATUS AND HIGH-FREQUENCY SIGNAL INTERPOLATION METHOD

(75) Inventors: Yasushi Sato, Fukuoka (JP); Atsuko Ryu, Fukuoka (JP)

(73) Assignee: Kyushu Institute of Technology, Fukuoka (JP)

( * ) Notice: Subject to any disclaimer, the term of this patent is extended or adjusted under 35 U.S.C. 154(b) by 670 days.

(21) Appl. No.: 12/448,419

(22) PCT Filed: Dec. 25, 2007

(86) PCT No.: PCT/JP2007/074826

§ 371 (c)(1), (2), (4) Date: Oct. 27, 2009

(87) PCT Pub. No.: WO2008/081777

PCT Pub. Date: Jul. 10, 2008

(65) Prior Publication Data

US 2010/0057230 A1 Mar. 4, 2010

(30) Foreign Application Priority Data

Dec. 25, 2006 (JP) ................................ 2006-348356

(51) Int. Cl.
*G06F 17/00* (2006.01)

(52) U.S. Cl. ............................ 700/94; 381/61; 704/500

(58) Field of Classification Search .................... 700/94; 704/500; 381/61, 316
See application file for complete search history.

(56) References Cited

U.S. PATENT DOCUMENTS 6,867,356 B2 * 3/2005 Nishimoto ..................... 84/603
7,328,160 B2 2/2008 Nishio et al.
7,330,814 B2 * 2/2008 McCree ....................... 704/219
(Continued)

FOREIGN PATENT DOCUMENTS

EP 1158495 A2 11/2001
(Continued)

OTHER PUBLICATIONS

International Search Report PCT/ISA/210, PCT/JP2007/074826, Apr. 8, 2009 (4 pages).

*Primary Examiner* — Walter F Briney, III
(74) *Attorney, Agent, or Firm* — Rader, Fishman & Grauer PLLC

(57) ABSTRACT

A favorable high-frequency signal is generated and practical high-frequency signal interpolation is implemented through simple processing. A digital audio signal reproduced by an instrument, which also carries out compression, is supplied as an original signal to an input terminal 1, and this original signal is then supplied to a digital sample and hold circuit 3 via a band-pass filter 2. The signal from the digital sample and hold circuit 3 is supplied to a ±1 multiplier 6, which then alternately inverts sign bits. The harmonic components of this signal in which the sign bits are inverted alternately are extracted by a high-pass filter (HPF) 7. Meanwhile, the original signal from the input terminal 1 is supplied to a delay circuit 8 equivalent to the processing time consumed by the aforementioned digital sample and hold circuit 3 and related circuits, forming an adjusted, delayed signal. The signals from the high-pass filter (HPF) 7 and the delay circuit 8 are then added by an adder 10, and the resulting added signal is then output to an output terminal 11.

3 Claims, 4 Drawing Sheets

U.S. PATENT DOCUMENTS

| | | | |
|---|---|---|---|
| 7,356,150 | B2 | 4/2008 | Ejima et al. |
| 7,392,176 | B2 | 6/2008 | Nishio et al. |
| 2003/0088328 | A1 | 5/2003 | Nishio et al. |
| 2005/0091051 | A1 | 4/2005 | Moriya et al. |
| 2007/0250310 | A1 | 10/2007 | Sato et al. |

FOREIGN PATENT DOCUMENTS

| | | | |
|---|---|---|---|
| EP | 1431962 | A2 | 6/2004 |
| JP | 02-311006 | A | 12/1990 |
| JP | 09-062294 | A | 3/1997 |
| JP | 09-064750 | A | 3/1997 |
| JP | 10-083197 | A | 3/1998 |
| JP | 2001-337700 | A | 12/2001 |
| JP | 2003-140692 | A | 5/2003 |
| JP | 2004-184472 | A | 7/2004 |
| JP | 2004-289196 | A | 10/2004 |
| JP | 2005-210124 | A | 8/2005 |
| JP | 2007-025480 | A | 2/2007 |
| WO | WO-2005/011127 | A1 | 2/2005 |
| WO | WO-2006/001218 | | 1/2006 |

* cited by examiner

| | | | |
|---|---|---|---|
| a | −Φ | X(−1) | +Φ |
| b | +Φ | X(+1) | +Φ |
| c | −Φ | X(−1) | +Φ |
| d | +Φ | X(+1) | +Φ |

HIGH-FREQUENCY SIGNAL INTERPOLATION APPARATUS AND HIGH-FREQUENCY SIGNAL INTERPOLATION METHOD

TECHNICAL FIELD

The present invention relates to a high-frequency signal interpolation apparatus and a high-frequency signal interpolation method suitable for digital audio equipment, which performs compression such as MP3, telephones, and similar devices etc.

BACKGROUND ART

Recently, use of audio data representing sound such as music and the like by distributing it via a network such as the Internet and the like, and recording it on a recording medium such as a mini disk (MD) has been actively pursued. As such, with audio data which is distributed across networks or recorded on a recording medium, increase in data amount and widening of the occupation band width due to the excessively widened band width needs to be avoided. Therefore, normally, components of a specified frequency or greater are removed from the music and the like to be supplied.

For example, components of approximately 16 kHz or greater are removed from MP3 (MPEG1 audio layer 3) format audio data and ATRAC 3 (Adaptive TRansform Acoustic Coding 3) format audio data.

High-frequency components of approximately 16 kHz or greater are removed as such because components of frequencies exceeding the audible region are considered unnecessary in relation to human hearing capacity. However, it has been pointed out recently that signals completely removed of high-frequency components may have slightly changed tone quality, which may be deteriorated from that of the original music.

Therefore, many devices for high-frequency component interpolation have been made conventionally. For example, an apparatus which generates an interpolation signal by converting the frequency of a to-be-interpolated signal, as disclosed in Japanese Unexamined Patent Application Publication No. 2004-184472 (hereafter abbreviated as Patent Document 1), and an apparatus which generates an interpolation signal without correlation to the original signal and adds it to a high-frequency signal, as disclosed in Japanese Unexamined Patent Application Publication No. Hei 2-311006 (hereafter abbreviated as Patent Document 2) are well-known. The technology disclosed in Patent Document 2 extracts the high-frequency component of a white noise signal, which is generated by a white noise generator and does not have correlation with the original signal, and adds it to the original signal.

DISCLOSURE OF INVENTION

However, while both of the technologies disclosed in Patent Documents 1 and 2 interpolate removed high-frequency signals, the technology disclosed in Patent Document 1 requires a complicated circuitry employing a DSP (Digital Signal Processor) for frequency conversion. Moreover, with the technology disclosed in Patent Document 2, since a high-frequency signal without correlation to the original signal is extracted and added to the original signal, such high-frequency interpolation cannot provide a quality resulting signal.

On the other hand, the inventor(s) filed a 'high-frequency interpolation method and apparatus', which firstly extracts harmonic components of an envelope component of the original signal and secondly interpolates the missing high-frequency component therewith, as Japanese Patent Application No. 2005-210124. With this prior invention, the Hilbert transform which decomposes a signal into a real part and an imaginary part in order to extract harmonic components is employed, and the square root of the real part squared plus the imaginary part squared is taken so as to form high-frequency components. As a result, the prior invention allows very high sound quality interpolation, and also receives high evaluation such as being introduced to commercial audio goods.

However, this prior invention requires a relatively large number of computations for the Hilbert transform and square root calculation, which are carried out for extraction of harmonic components. Therefore, especially small audio equipment and related devices, which have a central processing unit (CPU), may have a problem with an increased processing load on the central processing unit since the CPU is shared for other processing (e.g., video display). Moreover, since strengthening the capability of the central processing unit only for this load increase results in provision of an expensive apparatus, it is not desirable.

The present invention is devised through consideration of the aforementioned actual condition. An objective thereof is to provide a simply structured 'high-frequency interpolation apparatus and method' which can perform high-quality interpolation of a high-frequency signal.

Namely, this application resolves the aforementioned problems. In order to reach the object of the present invention, an aspect of the high-frequency interpolation apparatus according to the present invention is characterized by including a hand-pass filter, which extracts a signal component of a predetermined frequency band from a sampled original signal supplied to an input terminal; a digitally sample and hold means, which digitally samples and holds the extracted signal component in sync with a clock signal of a lower frequency than that of a sampling signal for the sampled original signal where the clock signal is synchronous to the same sampling signal; a ±1 multiplier, which alternately inverts sign bits of digital values output from the digitally sample and hold means in sync with the clock signal; a high-pass filter, which extracts high-frequency components of a signal having sign bits inverted alternately by the ±1 multiplier; and an adder, which adds an output signal of the high-pass filter to the original signal supplied to the input terminal.

As another aspect of the high-frequency interpolation apparatus of the present invention, the clock signal for digitally sampling and holding is generated by dividing the sampling signal for the original signal.

Moreover, a high-frequency signal interpolation method of the present invention includes the step of extracting a signal component of a predetermined frequency band from a sampled original signal. Next, the method includes digitally sampling and holding the extracted signal component in sync with a clock signal of a lower frequency than that of a sampling signal for the sampled original signal where the clock signal is synchronous to the same sampling signal. Then, the method includes alternately inverting sign bits of digital values digitally sampled and held in sync with the clock signal; and extracts high-frequency components of a signal having sign bits inverted alternately and adding the resulting extracted high-frequency components to the original signal.

According to the high-frequency interpolation apparatus and the high-frequency interpolation method of the present invention, since signal bits of digital values, which are digitally sampled and held with a clock signal of a lower frequency than that of a sampling frequency of an original signal, are inverted alternately, and harmonic components of signals generated by inverting the sign bits are extracted and interpolated, favorable high-frequency signals may be generated by a very simple structure, and practical high-frequency signal interpolation may be implemented without increase in load on the central processing unit.

DESCRIPTION OF REFERENCE NUMERALS

1 . . . input terminal, 2 . . . band-pass filter, 3 . . . digital sample and hold circuit, 4 . . . input terminal for signal sampling, 5 . . . frequency divider, 6 . . . ±1 multiplier, 7 . . . high-pass filter, 8 . . . delay circuit, 10 . . . adder, 11 . . . output terminal

BEST MODE FOR CARRYING OUT THE INVENTION

An exemplary embodiment of the present invention will be described hereafter with reference to the drawings.

Figure 1:
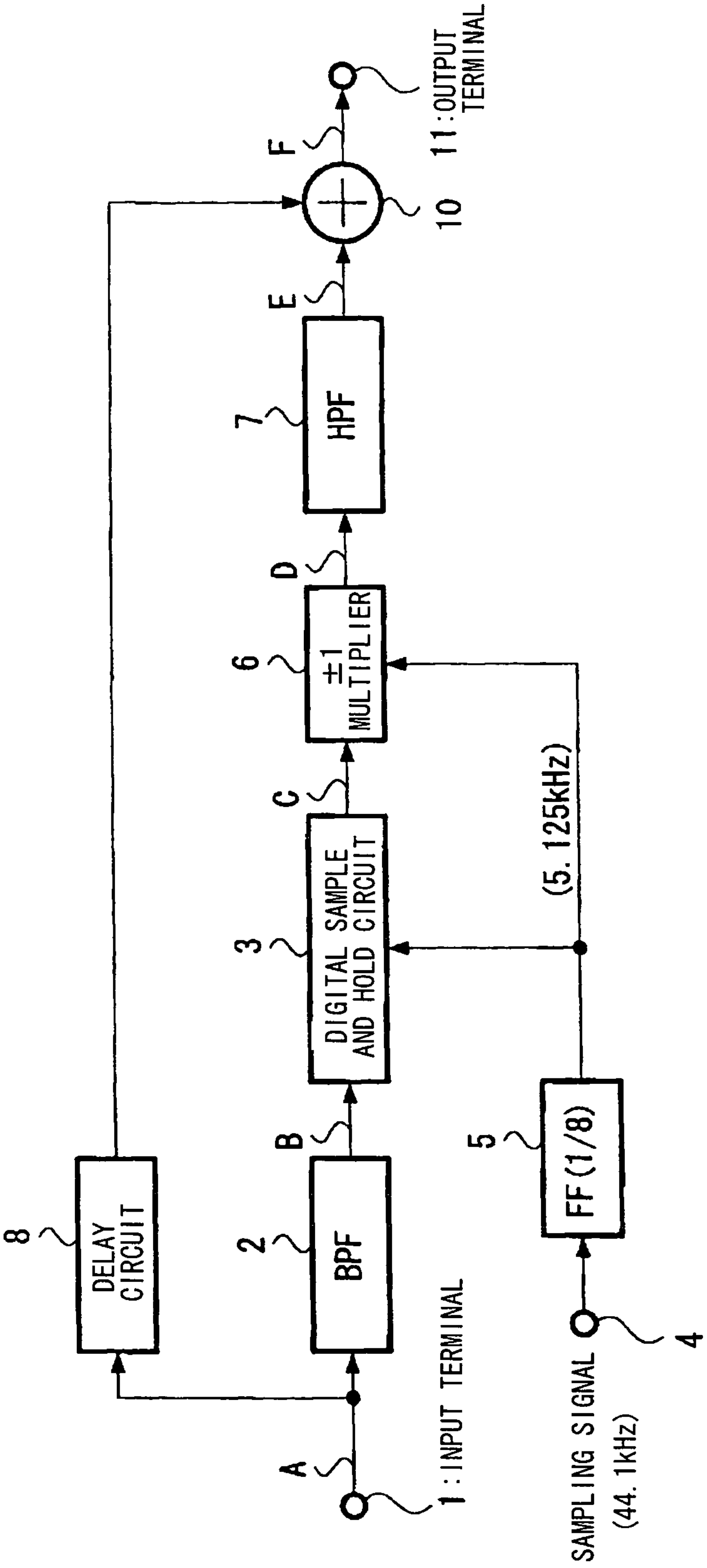
FIG. 1 is a block diagram showing an exemplary embodiment of an apparatus to which is applied a high-frequency signal interpolation apparatus and a high-frequency signal interpolation method according to the present invention.

FIG. 1 is a block diagram showing an exemplary embodiment of a high-frequency signal interpolation apparatus according to the present invention.

As shown in FIG. 1, the high-frequency signal interpolation apparatus of this embodiment includes an input terminal 1 and an output terminal 11. A band-pass filter (BPF) 2 and a delay circuit 8 are connected to the input terminal 1. The band-pass filter 2 is connected to a digital sampling and holding circuit 3, and the digital sample and hold circuit 3 is connected to a ±1 multiplier 6. The ±1 multiplier 6 is connected to a high-pass filter 7, and the high-pass filter 7 is connected to an adder 10. Moreover, the delay circuit 8 is also connected to the adder 10. Furthermore, the adder 10 is connected to the output terminal 11.

Moreover, an input terminal 4 is provided, supplied with a sampling signal of 44.1 kHz. The input terminal 4 is connected to a frequency divider 5, and output of the frequency divider 5 is supplied to the digital sample and hold circuit 3 and the ±1 multiplier 6.

Figure 2:
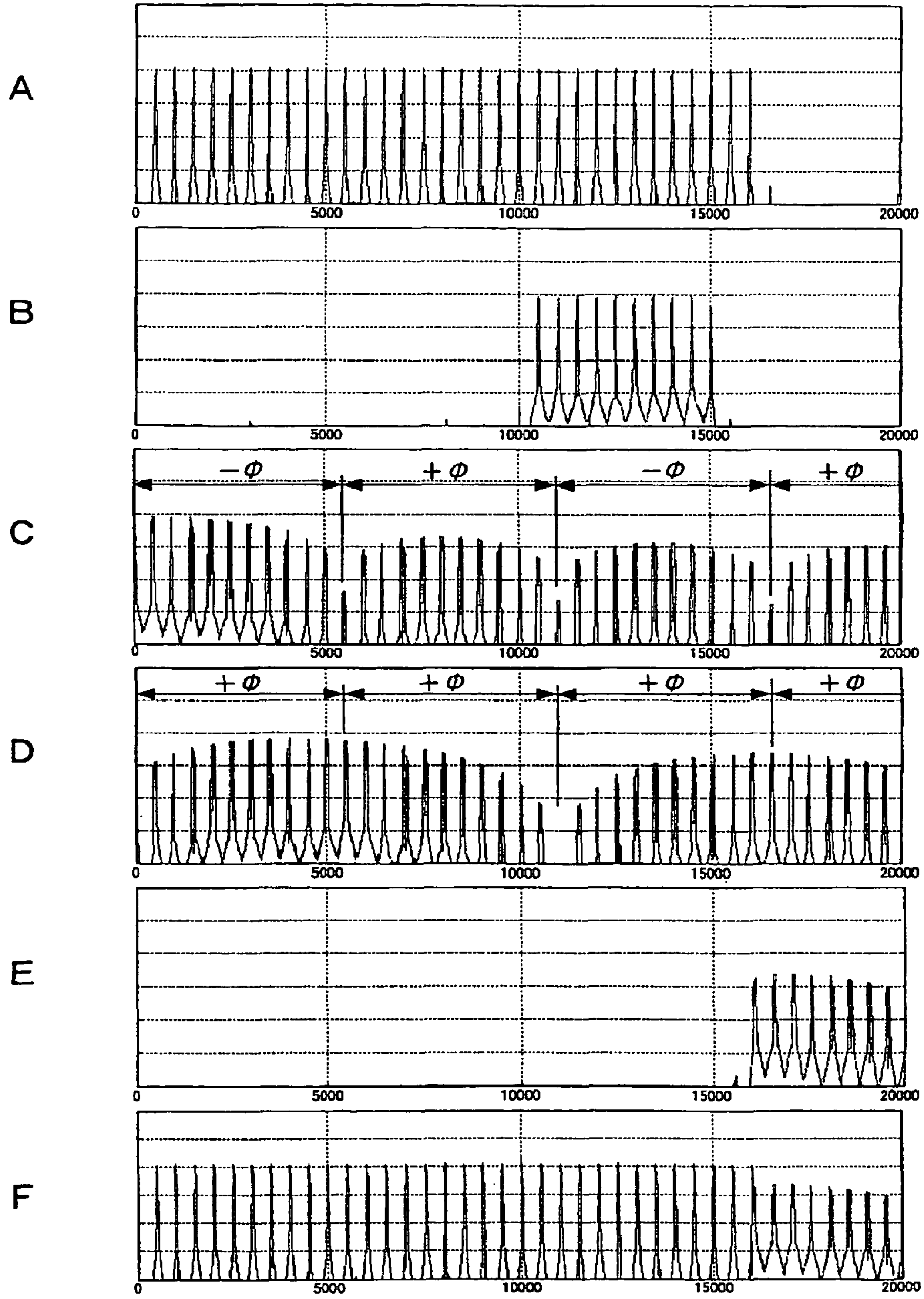
FIG. 2 shows frequency characteristics of signals for each unit of the block diagram shown in FIG. 1.
Figure 3:
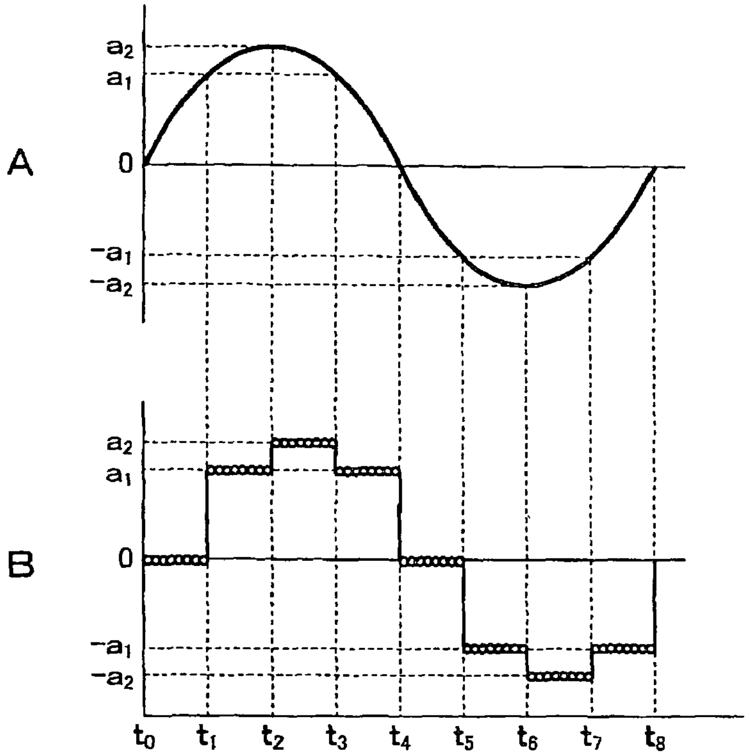
FIG. 3 is waveform graphs showing a signal obtained by digitally sampling and holding an input signal.

Next, operation of the embodiment (hereafter referred to as 'this working example') according to the present invention is explained based on waveform graphs of FIG. 2 and FIG. 3.

In FIG. 1, a digital audio signal reproduced by a device, which also performs compression such as MP3 or ATRAC 3, for example, is supplied as an original signal to the input terminal 1. This original signal is the sampling signal from which frequency components of 16 kHz and greater, for example, are removed, as shown in FIG. 2A. The sampling frequency is 44.1 kHz, which is the sampling frequency for a typical digital audio signal.

The original signal supplied to the input terminal 1 is supplied to the band-pass filter 2, and, for example, 10 to 15 kHz high-frequency components of the original signal, as shown in FIG. 2B, are extracted. This extracted high-frequency component signal is supplied to the digital sample and hold circuit 3, which then digitally samples and holds the signal using a lower frequency than the sampling frequency 44.1 kHz. The frequency for this digitally sampling and holding is a clock signal (digitally sampling and holding signal) of 5.5125 kHz, which is provided by the frequency divider 5 dividing the sampling frequency 44.1 kHz into an eighth.

Next, operation of the digital sample and hold circuit 3 is explained based on FIG. 3. Here, while the signal supplied to the digital sample and hold circuit 3 from the band-pass filter 2 is a digital audio signal, it is schematically shown as an analog signal in FIG. 3A.

With the digital sample and hold circuit 3, one signal period shown in FIG. 3A is sampled at eight times $t_0$, $t_1$, . . . $t_7$. Namely, every eighth sample value of the digital audio signal (64 values per cycle) is taken (sampled), and these sampled values are held at intervals of ⅛ period, as shown in FIG. 3B. More specifically, 0 is held at time $t_0$, $a_1$ is held at time $t_1$, and $a_2$ (peak value) is held at time $t_2$. Similarly, 0 is held at time $t_4$, $(-a_1)$ is held at time $t_5$, and $(-a_2)$ is held at time $t_6$.

In summary, the digitally sampled and held signal is generated by holding for eight subsequent sampling periods the sampled signal, which is generated by the frequency divider 5 sampling in sync with the $1/8^{th}$-frequency-divided clock signal. Namely, the digitally sampled and held signal (signed binary) forms edges in a staircase pattern as shown in FIG. 3B, and these edges naturally include harmonic components.

In other words, through such digital sampling and holding, signals in the frequency band of 10 kHz to 15 kHz as shown in FIG. 2B will be developed into high-frequency components and low-frequency components turning back up around each of a digitally sampled and held signal frequency of 5.5125 kHz, 11.025 kHz, which is double that frequency, 16.5375 kHz, which is triple that frequency . . . (refer to FIG. 2C). The developed signals necessary for this working example are those expanded and developed to 16 kHz or greater.

Note that the signals shown in FIG. 2C in the frequency bands 5.5125 kHz to 11.025 kHz and 16.5375 kHz to 20 kHz have the same phase ($\phi$) whereas frequency bands 0 kHz to 5.5125 kHz and 11.025 kHz to 16.5375 kHz have inverse phases ($-\phi$).

Therefore, processing to make the frequency bands 11.025 kHz to 16.5375 kHz and 16.5375 kHz to 20 kHz have the same phase is necessary. This is because, of the 15 to 20 kHz high-frequency signals necessary in this working example, low frequency components (15 to 16.5375 kHz) and high frequency components (16.5375 to 20 kHz) have inverse phases with 16.5375 kHz as a boundary, and amplitude near frequency 16.5375 kHz decreases extremely.

Consequently, in order to make the frequency bands 11.025 kHz to 16.5375 kHz and 16.5375 kHz to 20 kHz be have the same phase, the signals shown in FIG. 2C developed by the digital sample and hold circuit 3 are supplied to the ±1 multiplier 6 in this working example. The clock signal of 5.5125 kHz from the frequency divider 5 is also supplied to the ±1 multiplier 6, and processing of alternately inverting the sign bit of the digitally sampled and held digital value is performed in sync with the clock signal.

As a result, a signal turning back up at all the frequencies of the digital sample and hold signal as shown in FIG. 2D is formed by the ±1 multiplier 6. Namely, outputs of the ±1 multiplier 6 (FIG. 2D) are signals having inverted phases of signals in the bands 0 to 5.5125 kHz and 11.025 to 16.5375 kHz output from the digital sample and hold circuit 3 shown in FIG. 2C.

Figure 4:
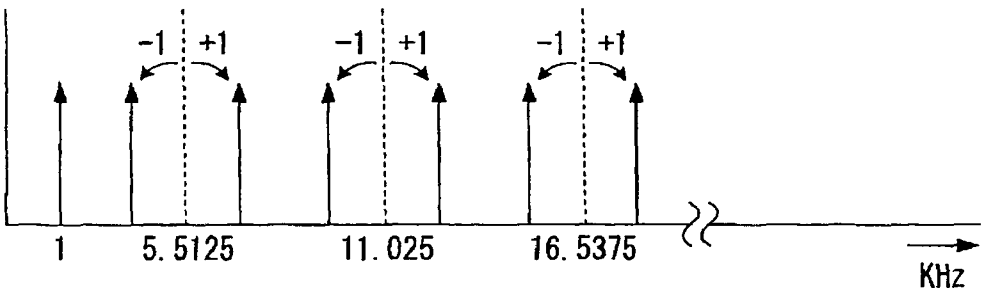
FIG. 4 is a graph showing frequency characteristics of the signal obtained by resulting from digitally sampling and holding an input signal.
Figures 5, 6:
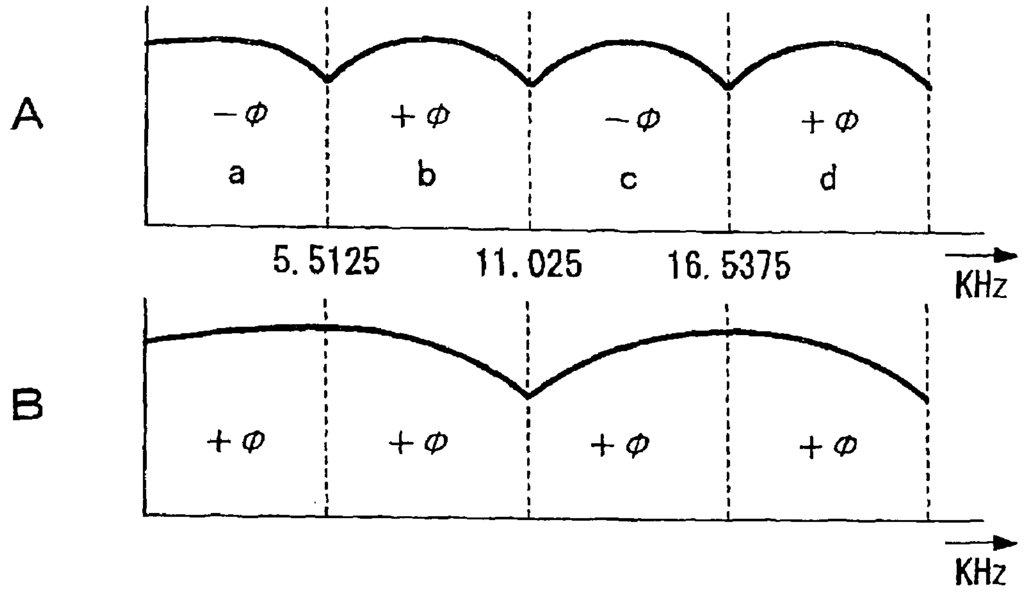
FIG. 5 schematically shows envelope curves for the frequency characteristics of the respective signals in FIGS. 2C and 2D.
FIG. 6 is a diagram showing the principle of operation of a ±1 multiplier.

Operation of this ±1 multiplier 6 is described in further detail based on FIGS. 4, 5, and 6. As mentioned above, digitally sampling and holding of, for example, a 1-kHz sine wave signal in sync with the 5.5125 kHz clock signal forms a signal having respective upper and lower frequencies 1 kHz-distant from 5.5125 kHz, 11.025 kHz, which is twice that frequency, 16.5375 kHz, which is triple that frequency, . . . as shown in FIG. 4.

FIG. 5 is a diagram simplistically showing a signal sampled and held by the digital sample and hold circuit 3 (refer to FIG. 2D). Signals having the frequency characteristics shown in FIG. 5A, namely signals having frequency bands 5.5125 kHz to 11.025 kHz (bandwidth b) and 16.5375 kHz to 20 kHz (bandwidth d) with phase $\phi$ and having frequency bands 0 to 5.5125 kHz (bandwidth a) and 11.025 kHz to 16.5375 kHz (bandwidth c) with phase $-\phi$ are supplied to the ±1 multiplier 6.

Since phases of the respective signals in each of the bandwidths (a) through (d) are alternately inverted in this manner, overlapping of signals having inverse phases occurs near 5.5125 kHz, 11.025 kHz, 16.5375 kHz . . . . As a result, amplitudes near the above-given respective frequencies are offset and decreased according to the frequency characteristics, namely a constriction phenomenon occurs as shown in FIG. 5A. As described above, the signals expanded and developed to 15 to 20 kHz are the ones necessary for the high-frequency signal interpolation apparatus according to this working example. There is a problem that these necessary band signals include 16.5375 kHz, and thus the constriction phenomenon occurs in this portion.

In order to eliminate this constriction phenomenon in this working example, the ±1 multiplier 6 is provided, and the same clock signal supplied to the digital sample and hold circuit 3 is supplied to the ±1 multiplier 6. As a result, the output of the ±1 multiplier 6 is a signal having inverted phases of those with input data signs in sync with the clock signal, namely a signal having the same phase $\phi$ in all frequency bands shown in FIG. 5B.

FIG. 6 is a table describing operation of the ±1 multiplier 6. As shown in FIG. 6, since the ±1 multiplier 6 multiplies the signal in bandwidth a and bandwidth c by minus one, the phase thereof is inverted. Namely, $-\phi$ is replaced by $\phi$. On the other hand, since the ±1 multiplier 6 multiplies the signal in bandwidth b and bandwidth d by plus one, inversion of the phase does not occur. Namely, the phase remains as $\phi$. Here, inversion of the sign by the ±1 multiplier 6 is the same as DSB modulation.

As such, the ±1 multiplier carries out DSB modulation eliminating phase inverted portions, thereby making all of the phases be positive (+). The signal (FIG. 2D or 5B) output from the ±1 multiplier 6 is supplied to the high-pass filter 7 as shown in FIG. 1. The high-pass filter 7 allows only higher frequencies than approximately 16 kHz of the input signal to pass through. Therefore, signal data of approximately 16 kHz or greater, which are high-frequency components, is extracted from the output signal (FIG. 2D) of the ±1 multiplier 6 and supplied to the adder 10.

Meanwhile, the original signal, which is limited in frequency band to 16 kHz or less and is input to the input terminal 1, is supplied to the delay circuit 8. The delay circuit 8 is for compensating for processing times (delay times) spent by the digital sample and hold circuit 3 and the ±1 multiplier 6, and provides delay time equivalent to the total processing time of these circuits. As a result, the signal output from the delay circuit 8 has the same phase as that of the output signal of the ±1 multiplier 6.

In this manner, the high-frequency signal (FIG. 2E) from the high-pass filter 7 and an original signal A (low-frequency signal) from the delay circuit 8 are supplied to the adder 10, which then outputs a summed signal F to the output terminal 11. Consequently, as shown in FIG. 2F, a signal resulting from superimposing a high-frequency signal E on the original signal A, namely a signal emphasized in high frequencies is output from the output terminal 11. In this manner, high-frequency signal interpolation is performed on a digital audio signal reproduced by an instrument, which also carries out compression such as MP3 or ATRAC3, for example.

According to this working example, since sign bits of digital values digitally sampled and held in sync with a frequency-divided sampling signal, are inverted alternately, and harmonic components of the signal generated by such inversion are extracted and interpolated, favorable high-frequency signals may be formed by a very simple structure, and practical high-frequency signal interpolation may be implemented without increase in load on the processing circuit.

Note that the present invention is not limited to the embodiment given above, and various modifications are possible as long as it does not deviate from the point of the present invention within the scope of the claims indicated.

The invention claimed is:

1. A high-frequency signal interpolation apparatus, comprising:

a band-pass filter, which extracts a signal component of a predetermined frequency band from a sampled original signal supplied to an input terminal;

a digital sample and hold means, which digitally samples and holds the extracted signal component in sync with a clock signal of a lower frequency than that of a sampling signal for the sampled original signal where the clock signal is synchronous to the same sampling signal;

a ±1 multiplier, which alternately inverts sign bits of digital values output from the digital sample and hold means in sync with the clock signal;

a high-pass filter, which extracts high-frequency components of a signal having sign bits inverted alternately by the ±1 multiplier; and an adder, which adds an output signal of the high-pass filter to the original signal supplied to the input terminal.

2. The high-frequency signal interpolation apparatus of claim 1, wherein the clock signal for digitally sampling and holding is generated by dividing the sampling signal for the original signal.

3. A high-frequency signal interpolation method, comprising the steps of:

extracting a signal component of a predetermined frequency band from a sampled original signal;

digitally sampling and holding the extracted signal component in sync with a clock signal of a lower frequency than that of a sampling signal for the sampled original signal where the clock signal is synchronous to the same sampling signal;

alternately inverting sign bits of digital values digitally sampled and held in sync with the clock signal; and extracting high-frequency components of a signal having sign bits inverted alternately and adding the resulting extracted high-frequency components to the original signal.

* * * * *